C. A. SWARTZ & S. FINLEY.
LIQUID FUEL BURNER.
APPLICATION FILED FEB. 15, 1910.
973,995.
Patented Oct. 25, 1910.
2 SHEETS—SHEET 1.
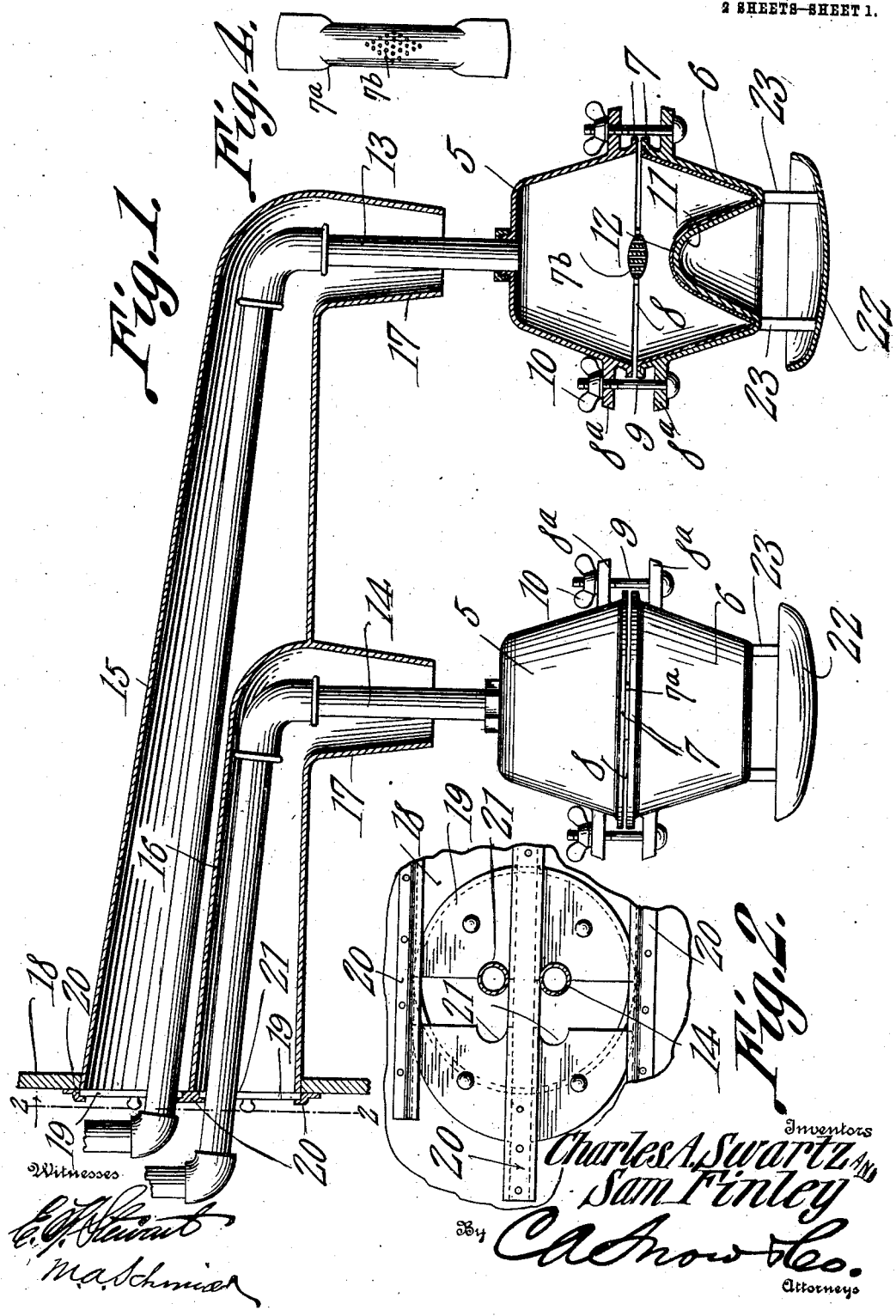
Inventors
Charles A. Swartz and
Sam Finley
By C. A. Snow & Co.
Attorneys
Witnesses

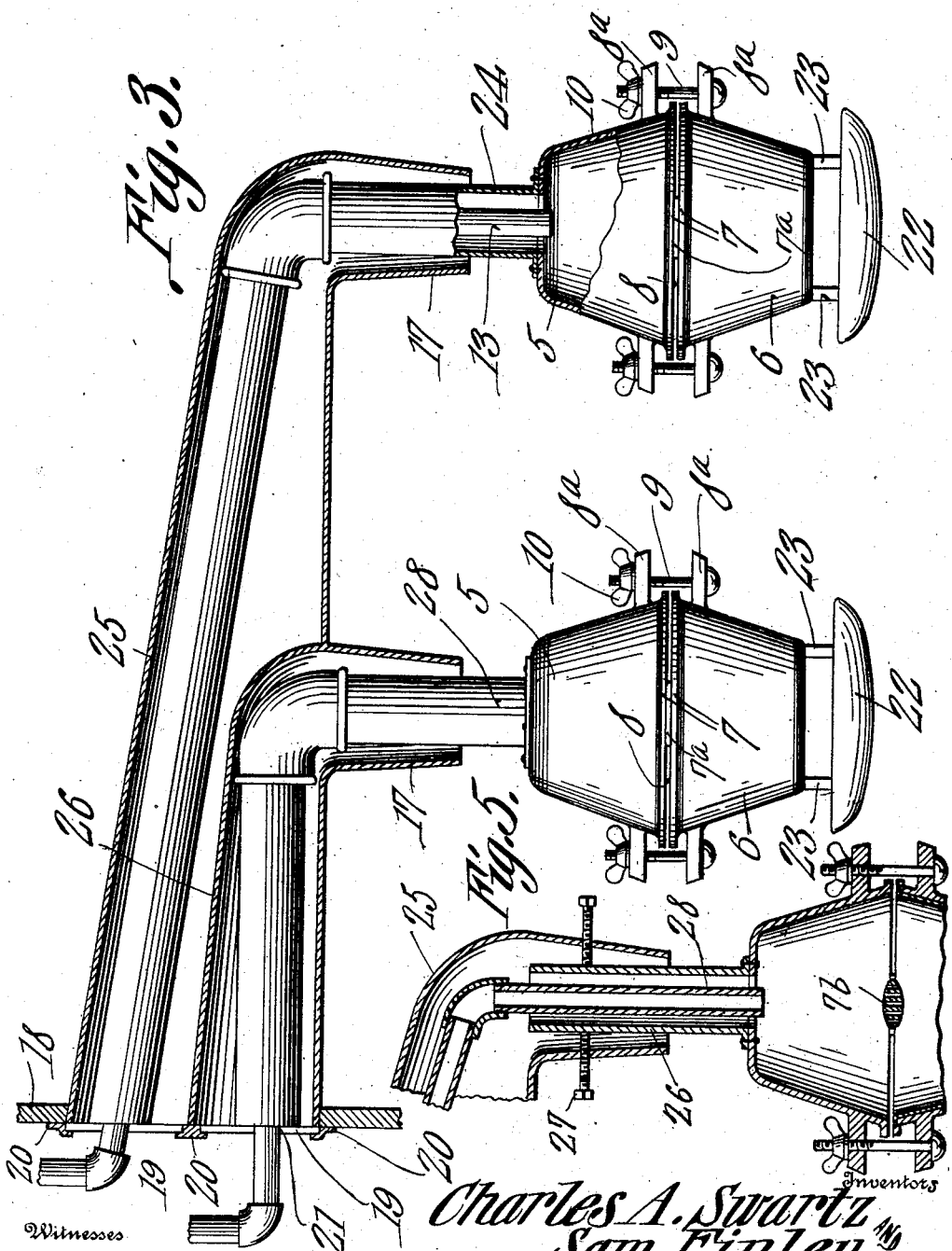

UNITED STATES PATENT OFFICE.

CHARLES A. SWARTZ AND SAM FINLEY, OF FREDERICK, OKLAHOMA.

LIQUID-FUEL BURNER.

973,995.  Specification of Letters Patent.  Patented Oct. 25, 1910.

Application filed February 15, 1910. Serial No. 543,926.

*To all whom it may concern:*

Be it known that we, CHARLES A. SWARTZ and SAM FINLEY, citizens of the United States, residing at Frederick, in the county of Tillman and State of Oklahoma, have invented a new and useful Liquid-Fuel Burner, of which the following is a specification.

This invention relates to liquid fuel burners designed for attachment to heating and cooking stoves, and especially adapted for using crude oils.

It is the object of the invention to provide a novel form of burner in which a more thorough vaporization of the oil is effected, and also to provide for an abundant supply of air.

The invention also has for its object to provide the vaporizer with a lining which can be removed and replaced on becoming filled with sediment.

Other objects and advantages of the invention will be apparent from the description appearing hereinafter, and in order that the invention may be better understood, reference is had to the accompanying drawings, in which:—

Figure 1 is an elevation of the burner, partly in section. Fig. 2 is a section on line 2—2 of Fig. 1. Fig. 3 is an elevation, partly in section, of a slightly modified form of burner. Fig. 4 is a plan view of the distributing and spacing device to be hereinafter described. Fig. 5 is a sectional view of another modified form of burner, having a slightly different arrangement of air supply pipes.

The burner which is the subject of the present invention belongs to that class characterized by a closed chamber in which the oil is vaporized. The vaporizing chamber comprises upper and lower portions 5 and 6 respectively, each of which is in the shape of a truncated cone, the lower cone being inverted so that its base or widest part will come opposite the base of the upper cone. At the bases of the two cones are outstanding flanges 7. They are also spaced apart slightly by a narrow bar 7ª fitted between the opposite ends of the cones. The spacing bar has a central perforated portion 7ᵇ the function of which will be presently made clear so as to form an outlet 8 for the vapor. The cones are formed with outstanding ears 8ª, the ears of one cone being in alinement with the ears of the other cone and provided with registering openings to receive bolts 9 fastened by wing nuts 10, whereby the two portions of the vaporizing chamber are separately connected.

The bottom of the lower portion 6 of the vaporizing chamber is raised to form a spreader cone 11 on the inside of this portion of the chamber, and the latter is also provided with a lining 12 which is made removable in order that it may be replaced when it becomes filled with sediment or burns out. Inasmuch as the two portions of the vaporizing chamber are separably connected, they can be readily disconnected when the lining is to be removed.

Fig. 1 of the drawing shows two vaporizing chambers constructed as herein described, but it will be understood that their number is immaterial and may be varied according to the size of the fire desired.

To each vaporizing chamber is connected an oil supply pipe, these two pipes being indicated at 13 and 14, respectively. The oil pipes enter at the center of the upper portion of the chambers so as to discharge on the perforated central portion 7ᵇ of the spacing bar, from which it drops on the apex of the spreader 11. Air is supplied to the burner through a pipe 15 through which the oil pipes 13 and 14 pass. The air pipe has a partition 16 to form two separate air passages for supplying the respective burners. One of the oil pipes extends through one of these passages, and the other oil pipe extends through the other passage. Each air passage leads to a downwardly extending outlet portion 17 terminating a short distance from the top of the upper portion of the respective vaporizing chambers. The oil pipes are spaced from the inner walls of the air passages so that the air may flow therethrough. The air pipe 15 is mounted in an opening made in one of the walls 18 of the stove to which the burner is applied, and it extends into the stove so as to properly position the burners in the fire pot thereof. The outer or inlet end of the air pipe is provided with dampers for regulating the air supply. These dampers are four similar plates 19 slidably mounted over the inlet end of the air pipe in guides 20 secured to the wall 18. Two plates are provided for each air passage, said plates sliding in opposite directions, and having their opposite edges recessed as indicated at 21 to clear the oil pipe when closed.

Beneath the lower portion 6 of the vaporizing chamber is mounted an open pan or tray 22 which is provided for initially heating the vaporizing chamber as will be presently described. The pan is spaced a short distance from the bottom of the vaporizing chamber, and is supported thereon by depending hangers 23.

In operation, a fire is made in the pan 22 to initially heat the vaporizing chamber. After this chamber is heated, the oil is turned on, and allowed to run into the same, it dropping on the perforated portion 7$^b$ of the spacing bar which scatters it and allows it to drop on the raised bottom 11 the oil being thus spread through the casing. The oil on coming in contact with the hot surface of the casing is at once vaporized and the vapor issues from the chamber through the outlet 8 and is ignited from the pan 22. The air is fed downwardly toward the vaporizing chamber and spreads the flame in all directions, so that perfect combustion is had. After the burner has started, the vaporizing chamber is kept hot by the burning vapor.

In Fig. 3 a slightly modified form of burner is shown. The vaporizing chamber is constructed as the vaporizing chamber already described, but is also entered by an air supply pipe 24. By this arrangement, air is mixed with the vapor in the chamber and the mixture escapes through the outlet 8, and is burned as before. An air supply pipe similar to the one already described is provided for delivering air to the outside of the burner from above, the air pipe to the vaporizing chamber passing therethrough, and the oil pipe passing through the air pipe 24. In the modified structure two burners are also shown, and the main air pipe 25 is divided by a partition 26 in the same manner and for the same purpose as the air pipe 15.

In the modification shown in Fig. 5, an air supply pipe 25 supports the vaporizing chamber, a tube 26 rising from the top of said chamber, and extending into the pipe 25, to which pipe it is secured by set screws 27 passing through the pipe, and screwing against the tube. An oil supply pipe 28 passes from the pipe 25 into the tube 26, and extends through the latter so as to discharge into the vaporizing chamber. Both ends of the tube 26 are open, so that air is delivered into the vaporizing chamber by said tube. The pipe 25 discharges on the outside of the vaporizing chamber, a short distance above the same, as in the other forms of burners hereinbefore described.

What is claimed is:—

1. In a liquid fuel burner, a closed chamber having a vapor outlet, and a raised bottom to form a spreader on the inside of the chamber, a perforated bar extending across the chamber above the raised bottom, and a fuel supply pipe entering the chamber, and discharging on the perforated bar.

2. In a liquid fuel burner, a vaporizing chamber comprising upper and lower portions, a bar extending between said upper and lower portions and spacing the same apart to provide a vapor outlet, the lower portion of the vaporizing chamber having a raised bottom to form a spreader, and the aforesaid bar being perforated and located above said raised bottom, and a fuel supply pipe entering the chamber through the upper portion thereof, and discharging on the perforated bar.

In testimony that we claim the foregoing as our own, we have hereto affixed our signatures in the presence of two witnesses.

CHARLES A. SWARTZ.
SAM. FINLEY.

Witnesses:
W. L. COUGHLIN,
W. D. MOORE.